Patented Oct. 27, 1936

2,058,865

UNITED STATES PATENT OFFICE 2,058,865

PROCESS OF BONDING RUBBER AND METAL

Thomas R. Griffith, Ottawa, Ontario, Canada, assignor to Russell J. Reaney, Ottawa, Ontario, Canada No Drawing. Application October 14, 1933, Serial No. 693,673

3 Claims. (Cl. 154—43)

This invention relates to a process of bonding rubber and metal and appertains particularly to a bond obtained by means of a special process of applying and treating a combination of rubber compositions interposed as between fabric and metal.

The objects of the invention are to provide a process of bonding rubber and metal in which a bond of great strength is obtained that will not corrode or otherwise deteriorate with age, whose results are dependably consistent, and is simple to follow and requires but little time to complete.

The process hereinafter set forth will deal with the securing of a rubber impregnated fabric to a metal strip but it is to be understood that it is but one application of the process of bonding rubber and metal.

There is generally no difficulty in obtaining a good adhesion of vulcanized rubber to fabric, this effect being produced in rubber factories by passing fabric and unvulcanized, compounded rubber simultaneously between the rolls of a calender. The rubber is thus pressed into the fabric. In the manufacture of rubber belting, for instance, a very thin or friction coating of rubber is calendered on to one side of the fabric, just enough to fill the interstices of the fabric, while on the other side a thicker, or skim, coating of rubber is applied on the calender. The belt plies are caused to adhere together by placing them together so that the skim coating on one side of the fabric lies on the frictioned side of the next ply, and so on. By the application of heat and pressure in a vulcanizing press the rubber is vulcanized and a firm bond is thus obtained between the successive layers of fabric.

A common method of determining the strength of the bond between rubber and fabric, or, rather, between two plies of fabric bonded by rubber, is to measure the force required to tear apart at the rate of one inch per minute two successive plies of fabric one inch wide. This force may run as high as 30 pounds, although a friction pull of from 15 to 18 pounds is satisfactory in most cases. In the tests herein described the friction pull recorded was the lowest or minimum force observed during the tearing of a strip four inches long, because, naturally, the strength of a bond is the strength at the weakest point.

A belting duck with a friction coating on one side and a skim coating on the other, applied on a rubber calender, was used in the experiments herein described. Two layers of this fabric, when vulcanized together in a vulcanizing press for 35 minutes at 141° centrigrade (40 pounds steam pressure) gave a minimum friction pull of 19 pounds. It was, therefore, considered that a satisfactory bond between fabric and metal would be one in which the minimum friction pull did not go below this figure.

Many attempts were made to obtain this strength of bond by following methods described in the patent and other literature on the subject, but none were successful. In some cases the bond immediately after vulcanization equalled this figure, but after a short period of aging, due to the corrosion of the metal or from various causes, the strength of the bond dropped to well below the desideratum.

The bond eventually developed was one in which the adhesion of the rubber to the metal was higher than that between the rubber and fabric, and gave a minimum friction pull of 21 pounds. In attempting to pull the fabric away from the metal, the separation occurred entirely between the rubber and the fabric, the skim coating of rubber which was originally calendered to the fabric adhering completely to the metal.

In order to obtain this bond the metal is first thoroughly cleaned, as by sandblasting, and over it is spread, or sprayed by means of a spray gun, a cement containing a rubber filler and what is known as thermoplastic rubber. Thermoplastic rubber is a form of rubber obtained by the chemical treatment of crude rubber, which is hard when cold but softens on heating. It is said to be due to or to be accompanied by the transformation of rubber from the open chain type of hydrocarbon to a cyclic hydrocarbon. It is made in differing degrees of hardness, according to the chemical treatment, and in these experiments it was found that a product which is fairly hard at room temperature gives the best bond, because a soft product, being too elastic, or having too low a tensile strength, would peel or tear easily off the metal or tear itself.

The filler in the cement above mentioned may be any filler or combination of fillers having a stiffening effect and may be incorporated into the cement by milling the filler into the thermoplastic rubber on the rubber mill, dissolving the resulting mixture in a rubber solvent. Thermoplastic rubber, though hard at room temperatures, has the property of softening owing to the heat of milling, and behaves like ordinary rubber on the rubber mill. The object of the filler is to harden still further the cyclo-rubber so that it will have greater strength of its own and so adhere more firmly to the metal. Aluminium powder and clay are, amongst others, suitable fillers. The solvent may be any rubber solvent, benzene being satisfactory. A suitable cyclo-rubber cement would have the following composition:

| | |
|---|---|
| Cyclo-rubber | grams 110 |
| Clay | grams 20 |
| Aluminium powder | grams 70 |
| Benzene | cubic centimeters 450 |

Now, soft rubber compounds, e. g., the skim coating applied to the fabric as above described, may be directly vulcanized to the film which the above or a similar cement would leave on the surface of a metal, and when this was done a fair bond was obtained (6 pounds, minimum), but in the friction test it was observed that the separation occurred between the rubber of the belting composition and the surface of the film.

It was discovered, however, that when a rubber cement containing a compound similar to a tire tread compound was spread or sprayed with a spray gun on to the dried film of cyclo-rubber compound, and also spread or sprayed on to the skim coating of the belting composition, in the friction test the separation occurred entirely between the fabric and the skim coating, indicating that the bond between the rubber and the metal was greater than that between the fabric and rubber. The minimum friction pull recorded in this way was 21 pounds. The bond does not deteriorate with age, and in fact, seems to improve with age.

A tread compound giving satisfactory results in this connection would be:

| | Grams |
|---|---|
| Smoked sheet | 100 |
| Aldol-a-naphthylamine | 1 |
| Zinc oxide | 5 |
| Stearic acid | 1.25 |
| Sulphur | 3 |
| Carbon black | 40 |
| Mercaptobenzothiazole | 1 |
| Mineral rubber | 8 |

The mixing is compounded on the rubber mill and then dissolved in benzene in the proportion of 50 grams of tread stock to 1 liter of benzene, or other rubber solvent. The optimum cure for this compound is, and should be, the same as that for the rubber of the belting composition, i. e., 35 minutes at 141° C.

If a pure gum compound were used in this cement instead of a stock containing a fair amount of stiffener, such as the tread stock above mentioned, the bond would not be as good (only 15 pounds friction pull) and in experiments with pure gum compounds the separation in the friction test was at the surface of the cyclo-rubber film. Thus, the bond, as indicated by the friction test, can only be brought up to the desired strength by compounding the rubber cement with stiffeners such as carbon black, clay, zinc oxide, aluminium powder, and fibrous materials such as ground leather, ground cotton, or asbestos. About 40% of the stiffener, or combinaton of stiffeners, calculated on the rubber, is generally satisfactory, although the quantity will depend upon the stiffener used and the other ingredients of the rubber compound.

It was also found that it is desirable not to allow any of the cement films to stand too long before the fabric is vulcanized to the rubber, because the surfaces lose their adhesiveness on standing. This was found to be particularly true with the cyclo-rubber cement. Turpentine, approximately 5% of the volume of the total solvent, may be added to the cement to delay the drying and keep the surface tacky for a longer period.

It will be apparent that if the cyclo-rubber itself is deemed hard enough to satisfy the requirements of the desired bond, the filler in the cyclo-rubber cement may be omitted.

It should also be pointed out that the skim coating on the fabric is not absolutely necessary, as the friction coating should be enough in most cases, or a layer of the tread cement, if thick enough, on the uncoated belting duck may do.

Again, the solution of the tread stock in a rubber solvent has been mentioned. There appears to be no reason why this tread stock cement could not be applied in the form of an aqueous emulsion, such as would be obtained by compounding rubber latex with the necessary ingredients in the usual way.

While the main object of the hereindescribed process has been to cause a belting fabric or belting duck to adhere to metal, still the bond obtained is really one of rubber to metal.

I claim:—

1. A strongly bonded composite product as of rubber and metal with an intermediate adhesive, said adhesive comprising a layer of strengthened thermo-plastic rubber immediately adjoining the metal and a vulcanizable rubber cement on said thermo-plastic rubber layer including only substantially three percent of sulphur and from substantially forty percent to substantially forty-five percent content of a mixture of carbon black and fibers used as strengthening fillers, such percentages being based on the rubber content.

2. A strongly bonded composite product as of rubber and metal with an intermediate adhesive, said adhesive comprising a layer of strengthened thermo-plastic rubber immediately adjoining the metal and a vulcanizable rubber cement on said thermo-plastic rubber layer including only substantially three percent of sulphur and from substantially forty percent to substantially forty-five percent of carbon black used as a strengthening filler, such percentage being based on the rubber content.

3. A strongly bonded composite product as of rubber and metal with an intermediate adhesive, said adhesive comprising a layer of thermo-plastic rubber immediately adjoining the metal and a vulcanizable rubber cement on said thermo-plastic rubber layer including only substantially three percent of sulphur and from substantially forty percent to substantially forty-five percent of carbon black used as a strengthening filler, such percentage being based on the rubber content.

THOMAS R. GRIFFITH.